United States Patent
Barthel et al.

(10) Patent No.: US 8,562,304 B2
(45) Date of Patent: Oct. 22, 2013

(54) ELECTRICAL MOTOR ACTIVATION METHOD HAVING LOAD TORQUE ADAPTATION

(75) Inventors: Dieter Barthel, Rodenbach (DE); Ralf Hartmann, Kriftel (DE); Andreas Heise, Erzhausen (DE); Christian Bitsch, Heppenheim (DE); Daniel Schmitz, Neu-Anspach (DE); Andreas Richter, Neu-Anspach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 471 days.

(21) Appl. No.: 12/937,837

(22) PCT Filed: Mar. 9, 2009

(86) PCT No.: PCT/EP2009/052718
§ 371 (c)(1),
(2), (4) Date: Oct. 20, 2010

(87) PCT Pub. No.: WO2009/127472
PCT Pub. Date: Oct. 22, 2009

(65) Prior Publication Data
US 2011/0033322 A1     Feb. 10, 2011

(30) Foreign Application Priority Data
Apr. 15, 2008   (DE) .................. 10 2008 018 818

(51) Int. Cl.
*F04B 35/04*    (2006.01)
*H02P 7/29*     (2006.01)

(52) U.S. Cl.
USPC ..................... 417/44.1; 417/44.11; 310/68 B; 318/244; 318/245; 388/912

(58) Field of Classification Search
USPC ............... 417/44.1, 44.11; 388/912; 318/244, 318/245; 310/68 B
See application file for complete search history.

(56) References Cited

U.S. PATENT DOCUMENTS

| | | |
|---|---|---|
| 5,432,421 A | 7/1995 | Kessler et al. |
| 5,469,215 A | 11/1995 | Nashiki |

(Continued)

FOREIGN PATENT DOCUMENTS

| | | |
|---|---|---|
| DE | 1 015 303 B | 9/1957 |
| DE | 30 18 779 A1 | 11/1981 |

(Continued)

*Primary Examiner* — Peter J Bertheaud
*Assistant Examiner* — Dominick L Plakkoottam
(74) *Attorney, Agent, or Firm* — RatnerPrestia

(57) ABSTRACT

An electrical motor activation method for an electric motor including a rotor, connected to a motor shaft, and a stator having brushes. The stator comprises multiple commutator laminations for the commutation of windings disposed on the rotor and is activated by a pulsed or linearly controllable power source. The motor shaft is connected to a radially driven load, in particular a pump, which has a nonlinear torque curve via a motor revolution. A waviness signal is obtained from a voltage potential applied to the motor and/or from the motor current and rotor position information is obtained from the curve of said waviness signal.

16 Claims, 4 Drawing Sheets

(56) References Cited

U.S. PATENT DOCUMENTS

| | | | |
|---|---|---|---|
| 5,704,766 A | 1/1998 | Fennel et al. | |
| 6,628,893 B2* | 9/2003 | Ohno et al. | 388/800 |
| 7,800,321 B2* | 9/2010 | Knittel et al. | 318/244 |
| 2001/0048281 A1 | 12/2001 | Aokj et al. | |
| 2003/0034749 A1 | 2/2003 | Zinke et al. | |
| 2003/0122515 A1* | 7/2003 | Lutter et al. | 318/466 |
| 2004/0111233 A1 | 6/2004 | Gerlach | |
| 2005/0046375 A1* | 3/2005 | Maslov et al. | 318/650 |
| 2006/0202552 A1 | 9/2006 | Magel et al. | |
| 2006/0261763 A1* | 11/2006 | Iott et al. | 318/138 |
| 2007/0013331 A1 | 1/2007 | Kalb | |
| 2007/0273363 A1* | 11/2007 | Kurimoto et al. | 324/177 |
| 2008/0004832 A1 | 1/2008 | Linden et al. | |
| 2008/0079380 A1* | 4/2008 | Knittel et al. | 318/490 |
| 2008/0119995 A1* | 5/2008 | Ubel et al. | 701/49 |
| 2008/0230337 A1* | 9/2008 | Kajiyama et al. | 188/352 |
| 2009/0309451 A1* | 12/2009 | Roos | 310/179 |

FOREIGN PATENT DOCUMENTS

| | | |
|---|---|---|
| DE | 30 18 779 C3 | 11/1981 |
| DE | 232 790 A1 | 2/1986 |
| DE | 39 35 594 A1 | 5/1991 |
| DE | 42 29 045 A1 | 3/1994 |
| DE | 42 32 130 A1 | 3/1994 |
| DE | 196 02 362 A1 | 7/1997 |
| DE | 101 26 094 A1 | 12/2001 |
| DE | 101 24 615 A1 | 12/2002 |
| DE | 103 55 239 A1 | 3/2005 |
| DE | 20 2005 011 333 U1 | 11/2006 |
| DE | 10 2007 044 902 A1 | 4/2008 |
| EP | 1 037 052 A1 | 9/2000 |
| EP | 1 037 052 B1 | 9/2000 |
| EP | 1 284 540 A2 | 2/2003 |
| EP | 1 659 683 A | 5/2006 |
| WO | WO 01/95471 A1 | 12/2001 |

* cited by examiner

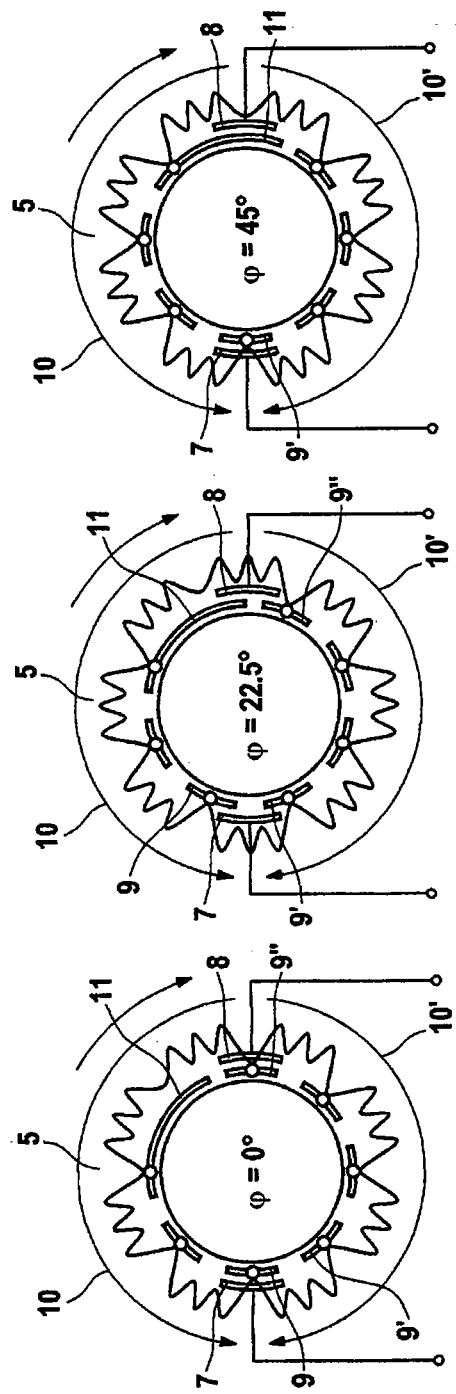
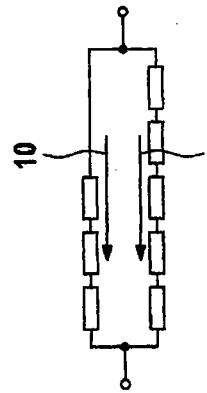
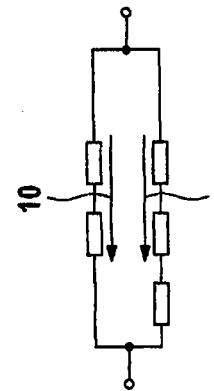
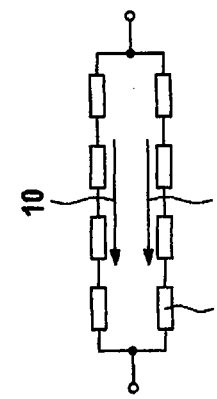

ELECTRICAL MOTOR ACTIVATION METHOD HAVING LOAD TORQUE ADAPTATION

CROSS REFERENCE TO RELATED APPLICATIONS

This application is the U.S. national phase application of PCT International Phase Application No. PCT/EP2009/052718, filed Mar. 9, 2009, which claims priority to German Patent application No. 102008018818.2, filed Apr. 15, 2008, the contents of such application being incorporated by reference herein.

FIELD OF THE INVENTION

The invention relates to an electrical motor drive method and to the use of said method.

BACKGROUND OF THE INVENTION

WO 01/95471 A1, which is incorporated herein by reference, describes a method for determining the rotary position of the drive shaft of a DC motor, in which method the current ripple (actual current ripple) is evaluated. To this end, a suitable reference current ripple is compared with the actual current ripple which is measured during operation of the motor.

DE 42 32 130 A1, which is incorporated herein by reference, discloses a circuit arrangement with which, in an ABS brake control device, the generator voltage of a DC pump motor may be determined during a pulse-width-modulated (PWM) drive operation. The delivery rate of the hydraulic pump is controlled with the aid of the generator voltage. However, the current ripple is not evaluated in this case. Evaluation of the generator voltage for determining the pump rotation speed in an ABS control device is also described in DE 103 55 239 A1, which is incorporated herein by reference. In this document, the rotation speed is controlled with the aim of allowing the valves to be driven in a noise-optimized manner. Finally, the hydraulic pressure generated by the pump is also indirectly determined here.

SUMMARY OF THE INVENTION

An object of the present invention is to specify a motor drive method, such as a DC motor drive method, which provides a load-adapted motor current in a simple manner, so that, for example, an audible ripple of fluctuations in load in the motor rotation speed is reduced.

According to aspects of the invention, this object is achieved by the electrical motor drive method described herein.

In the electrical motor drive method according to aspects of the invention, an electric motor, which may be a brushed motor, is driven by a pulsed or linearly controlled power source. Depending on the actual load which is applied to the shaft at a specific angular position of the motor, a specific motor rotation speed is produced for a specific pump current as a function of the design of the motor. However, the load torque during a revolution of the motor is not constant since the motor is connected to an angle-dependent load via the motor shaft. Therefore, the load has a torque (torque profile) which is dependent on the rotor position. A ripple signal is generated from the voltage potential (for example commutator voltage) applied to the motor and/or from the motor current, and evaluated.

According to embodiments of the invention, the rotation speed of the motor may be determined from this. Provision may be made for the rotation speed of the motor to also be controlled by the ripple signal. In accordance with a method according to aspects of the invention, the motor power is (suitably) varied during a revolution of the motor in accordance with the ripple signal and possibly other variables, for example the known load profile, such that the angular velocity is adapted to the demand during a revolution of the motor, so that the fluctuations in rotation speed are as low as possible and/or the period deviations in the ripple signal during a revolution of the motor are as low as possible and/or so that the development of noise of the entire assembly in which the motor is installed is as low as possible.

A 360° motor current drive profile (drive profile) may be generated on the basis of 360° torque profile characteristic variables of the load (for example load profile) and the ripple signal, said motor current drive profile being used to drive the current of the motor, in a manner adapted to the torque profile of the load, over at least one revolution of the motor.

A motor current drive profile may be possibly during a learning phase, determined on the basis of pump characteristic variables and the ripple signal or the rotation speed, said motor current drive profile being used to drive the current of the motor, in a manner adapted to the torque profile, over at least one revolution of the motor. As a result, it is possible to keep the rotation speed of the motor as constant as possible, even with a varying load torque. It goes without saying that it would also be feasible to impose another current profile (for example a current profile which reinforces the non-uniform course) if this appears to be expedient for a feasible use of the present method.

As already mentioned, the rotation speed of the motor may be determined from the voltage potential applied to the motor and/or from the motor current. A further special feature of an embodiment described here is that, in the field of electronic motor vehicle brake systems, it is possible to determine the rotation speed of a DC motor, which drives a pump, on the basis of an evaluation of the ripple of the motor current (commutation ripple). The commutation in the case of DC motors (brushed motors) causes a ripple in the supply current. The fundamental frequency of these waves (ripple frequency) is directly related to the motor rotation speed, and therefore it is possible to identify the rotation speed in an extremely sensitive manner with the aid of the ripple. The measured voltage potential and/or the motor current may be converted into a digital signal in which the pulse spacing is a measure of the measured rotation speed. The conversion may be performed using a Schmitt trigger an which may have an amplifier connected upstream.

If the DC motor is driven in a pulsed manner, for example by means of a pulse-width-modulation circuit (PWM), the above-described current ripple is produced both during the switch-on phase and during the switch-off phase. It is possible to take into account the current ripple only during one of these phases by designing the electronic circuit arrangement in a corresponding manner. However, the current ripple may be taken into account during the connection phase and the disconnection phase. This is possible on account of the signal initially being separately determined during said phases and then being combined again to form a common signal by means of an adaptation circuit. An analog multiplexer may be used for this purpose, said analog multiplexer connecting the two signals, which were standardized to the same voltage beforehand, to the evaluation circuit in a suitable manner.

The current ripple determined in this way may then be used for a method according to aspects of the invention. The pulse spacings in the digital signal may be determined for this purpose. The pulse spacings more or less accurately produce the period deviations of the ripple signal during one revolution of the motor and are therefore a measure of the constancy of the angular velocity of the motor during a 360° revolution of the motor. The time of a fluctuation in load during a revolution of the motor may then be determined from the pulse spacings. In accordance with this time, for example the time with the greatest fluctuation in load, the phase angle of the motor current drive profile with respect to a revolution of the motor is then defined.

The digital signal may be read in with the aid of an input capture register of a microcontroller. A suitable algorithm then evaluates the digital signal within the microcontroller. Electronic processing of the digital signal with discrete electronic components is likewise possible.

The motor profile may in principle, be adapted very accurately to the load profile. However, this degree of accuracy is very rarely required in practice. Therefore, it has proven valuable to increase the motor power by a predefined offset value for a specific time period at an angular position of the motor axis or of the rotor with an increased load, so that a rectangular profile of the drive current is produced around the region with the greatest fluctuation in load.

According to another embodiment of a method according to aspects of the invention, the rotor exhibits at least one electrical rotor change, which may be measured at the commutation signal, in an angular region, this rotor change allowing one or more angular positions to be marked. With the aid of the marking, it is possible, even entirely without an identifiable variation in the ripple signal, which variation is caused by the torque profile, or an additional position sensor, to determine the rotor position with the required accuracy and to drive the motor as a function of load with the known torque profile.

The rotor change may involve a) at least one of the commutator laminations of that part of the commutator which is mounted on the rotor being changed in relation to the other commutator laminations, aa) by said commutator lamination being composed of a different material and/or ab) said commutator lamination having a changed length with respect to the commutator circumference and/or ac) said commutator lamination having a different angular position, and/or b) the winding pattern or the number of turns of the turn segments fitted on the rotor armature being varied as a function of the angle.

The winding pattern may be changed, for example, by one of the rotor coils being wound with a number of turns which has been changed compared to the other rotor coils. If this rotor change is performed, for example, in a DC motor with two pole pairs and n slots in the commutator, the result is two current peaks, which are significantly changed compared to the other n-2 commutation ripples, with a spacing of 180°. Secondly, in a DC motor with 4 pole pairs and n slots in the commutator, the changed current peaks would be produced with a spacing of 90° (four current peaks which are significantly changed compared to the n-4 commutation ripples).

If the commutator lamination used for marking purposes is composed of a different material, it has a different electrical resistance to the other laminations. Therefore, it is possible to mark the angular position on account of this changed electrical behavior.

According to a further embodiment of the method, the rotor of the motor is oriented in relation to the pump shaft such that it has a defined angular position with respect to the angular position of the rotor and therefore the angular position of the at least one rotor change.

The angular position may be set and the rotor change is performed such that the change in torque produced by the rotor change automatically compensates for the existing fluctuations in load. This provides the advantage that an angle-dependent variation, which is adapted to the torque, in the motor torque can be performed without any special electronic driving of the motor.

The load may be a hydraulic pump and the above-described angular position is set such that a more uniform delivery of the hydraulic fluid and/or a reduction in noise of the motor pump assembly are/is achieved.

The invention also relates to a method in which the motor position signal which is obtained in the manner described above is used to drive, as a function of this, a fluid valve, such as a hydraulic valve, or even an analogously driven hydraulic valve. As a result, it is possible to compensate for fluctuations in pressure in the hydraulic system, these fluctuations in pressure being caused by non-uniform pump delivery.

The invention also relates to the use of the method described above in an electronic brake control system (for example ABS, ESP, ASR, EBC etc.). The invention relates to an antilock brake system and/or a wheel pressure control system, such as within an adaptive cruise control system (ACC) where the pressure fluctuations or noise produced by the pump, which are avoided according to aspects of the invention, may have an undesirable effect.

BRIEF DESCRIPTION OF THE DRAWINGS

The invention is best understood from the following detailed description when read in connection with the accompanying drawings. Included in the drawings is the following figures:

FIG. 4 shows schematic illustrations of examples of marked rotors.

DETAILED DESCRIPTION OF THE PREFERRED EMBODIMENTS

Figure 1:
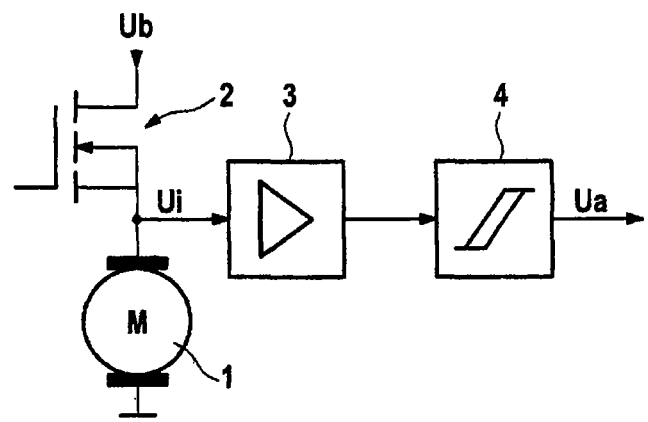
FIG. 1 shows a circuit arrangement for providing a digitized current ripple signal.

As illustrated in FIG. 1, motor 1 is driven in a pulsed manner by PWM driving of an electronic brake system. To this end, FET 2 is connected as a high-side switch between the poles of a DC voltage supply means and motor 1. The voltage $U_i$ is tapped off at the motor connection of the motor 1 which faces the FET 2, said voltage, on account of the commutator of the motor, having a ripple which is dependent on the rotation speed. Voltage $U_i$ is fed to an operational amplifier 3. The signal amplified by the operational amplifier 3 is converted into a rectangular digital signal by a Schmitt trigger 4.

Figure 2A:
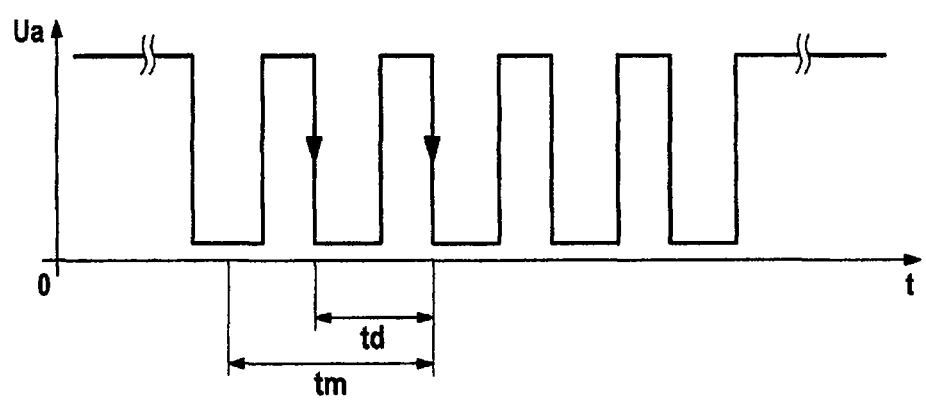
FIG. 2 shows the time profile of the digitally converted ripple signal without and with load (without a method according to aspects of the invention applied)

The diagram in FIG. 2a) shows the signal produced at the output of the Schmitt trigger 4. The signal has a rectangular profile and alternates between 0 and 5 V. The spacings of the flanks td vary as a function of the angular velocity of the motor shaft.

Figure 2B:
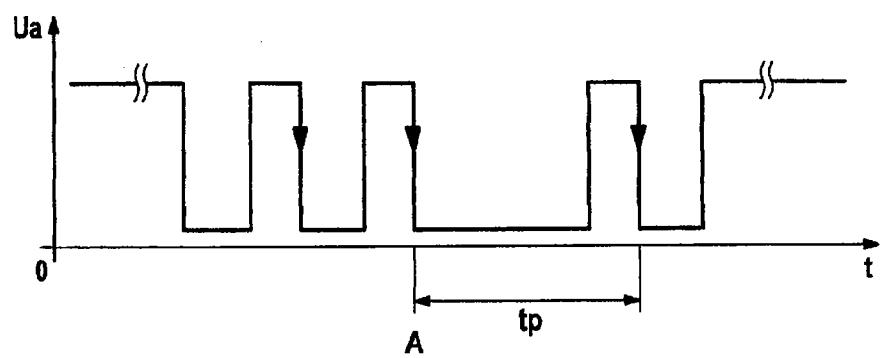
Figure 6:
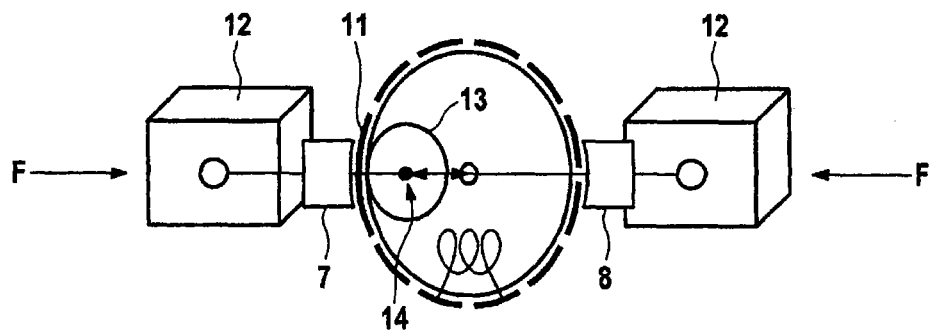
FIG. 6 shows an example of the orientation of the motor shaft in relation to the orientation of the eccentric of a pump.

The brushed motor 1, from which the pulse signal in FIG. 2b) originates, is connected to the pump of the hydraulic system of an ABS brake control means. The pump is an eccentric piston pump, as illustrated in FIG. 6, which is driven by means of a shaft and, on account of its non-symmetrical design, exhibits relatively high fluctuations in torque for each revolution of the pump shaft during delivery operation under load. These fluctuations in load which are present during pump operation are audible. As may be gathered from the time profile of the signal $U_a$ in FIG. 2b), the flank spacing within the region designated tp is considerably greater than the spacing of the other flanks. At this time, a high torque is applied to the pump shaft, and therefore the motor rotation speed drops sharply in this region. Such sharp drops in rotation speed occur once or more than once for each revolution of the shaft, depending on the design principle of the pump.

The digital signal is FIG. 2 is read in with the aid of an input capture register of a microcontroller. A suitable algorithm within the microcontroller evaluates the digital signal, the time A (FIG. 2b) from which the load snatch begins (in the illustrated example the beginning of the first long pulse interval) being determined during this evaluation process. A lead time B, which is present a specific time period $T_V$ before the time B, is then determined as a function of time A.

Figure 3A:
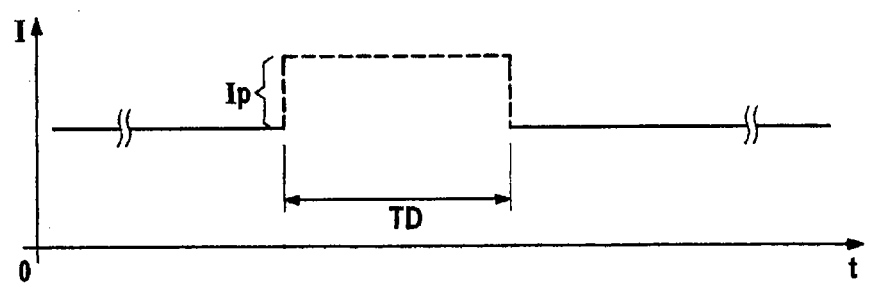
FIG. 3 shows various signal profiles with the method according to aspects of the invention applied.
Figure 3B:
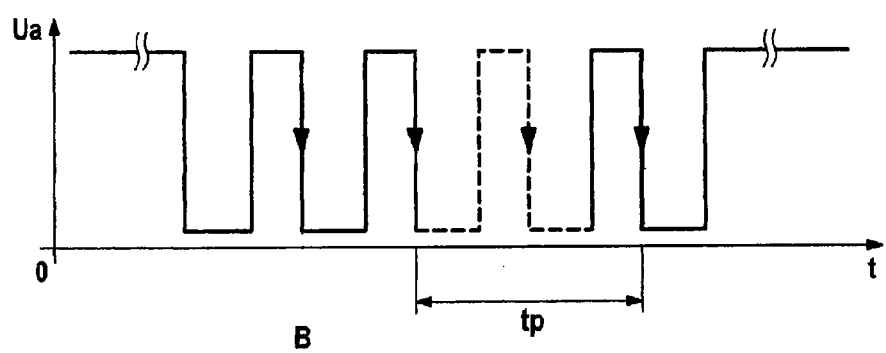

As illustrated in FIG. 3a), the motor current is increased by a specific quantity $I_P$ at time B. After time $T_D$ has elapsed, the motor current is again reduced to the value predefined by the brake control system. The magnitudes of the values $I_P$, $T_D$ and $T_V$ depend on the design of the pump, the motor and the hydraulics. The values may be determined, for example, by series of measurements. Another possible way of determining the above compensation parameters involves first carrying out a learning phase, in which suitable values are determined for the subsequent compensation phase. FIG. 3b) illustrates the digitized rotation speed signal $U_a$ during the motor operation phase, in which the above-described motor segment load compensation is carried out. In the exemplary application of the hydraulic pump, the fluctuations, which are described further above, in the flank spacings may be considerably reduced. As a result, the motor runs more uniformly and the hydraulic pump produces considerably less operational noise.

FIG. 4 illustrates three angular positions ($\phi=0°$, $\phi=22.5°$, $\phi=45°$) of a schematic rotor in which, within the collector, one lamination is considerably wider (double the width in the illustrated example) than the other laminations of the collector, with respect to the circumference of the commutator. Equivalent resistance circuit diagrams are illustrated beneath each of the three figures, a resistor symbol 6 symbolizing a winding segment of the rotor through which current flows in said equivalent resistance circuit diagrams. A voltage is applied to the brush contacts 7 and 8 in order to operate the motor.

As shown in image section a) of FIG. 4, the brush contacts 7 and 8 are each in contact with a collector lamination 9 and 10, so that a current may flow through the winding of the rotor. Accordingly, the equivalent circuit diagram in image section d) splits the current 10, 10' between two winding paths with the same resistance.

In image section b) of FIG. 4, brush contact 7 shorts the laminations 9 and 9' and contact 8 shorts the laminations 9" and 11 at an angular position $\phi=22.5°$. Collector lamination 11 is twice as wide as the other laminations 9. The equivalent circuit diagram illustrated in image section e) is produced for the winding resistances. Current path 10 has a lower resistance than current path 10' at $\phi=22.5°$.

In image section c) of FIG. 4, brush contacts 7 are in contact with collector lamination 9' at an angular position of $\phi=45°$. Brush contact 8 establishes contact with the wider lamination 11. The equivalent circuit diagram illustrated in image section f) is produced for the winding resistances. Current path 10 has a lower resistance than current path 10' at $\phi=22.5°$. The overall resistance is higher than at $\phi=45°$ but lower than at $\phi=0°$.

Figure 5:
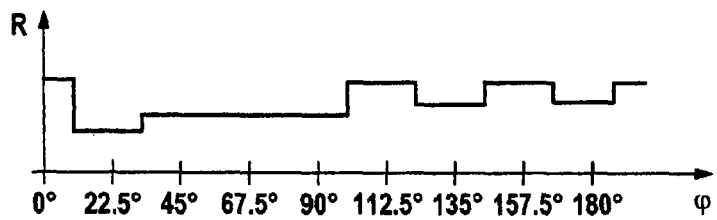
FIG. 5 shows a resistance profile for the winding resistance of the rotor in FIG. 4.

For further clarification, FIG. 5 illustrates the overall resistance R of the rotor windings for half a revolution of the rotor (180°) as a function of the angle.

FIG. 6 shows an illustration of a motor pump assembly. The pump comprises two pump pistons 12 (illustrated in a highly schematic manner) by means of which a force component F acts in the direction of the eccentric during delivery operation. Due to the eccentric position of the center 14 of the circle 13, the angular position of the eccentric is symbolized with respect to the pump shaft. In the illustrated angular position, the wider lamination 11 of the collector is situated opposite the left-hand motor brush 7. In this position, the resistance minimum of the rotor winding coincides with the dead center of the angle-dependent pump torque, so that noise is minimized, even without power control.

Figure 7:
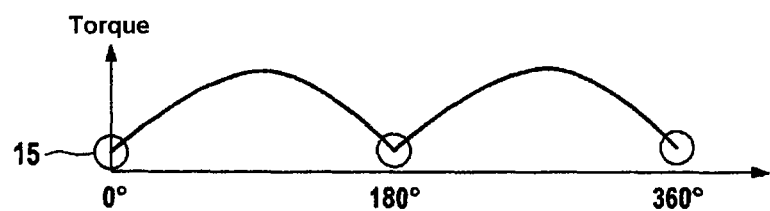
FIG. 7 shows an illustration of the 360° torque profile of an eccentric two-piston pump.

FIG. 7 illustrates the 360° torque profile of the eccentric two-piston pump in FIG. 6. The markings 15 symbolize the angular positions of the collector in which the wider lamination 11 is situated opposite a brush element 7 or 8. As may be seen in FIG. 7, this is always the case with suitable orientation of the pump shaft relative to the commutator when the torque on the pump shaft assumes a minimum value (dead centers of the eccentric). Therefore, a steady speed may be achieved by mechanically orienting the modified commutator lamination, even in the case of asymmetrical torque profiles (for example when the two pistons of the pump work against a different pressure).

The invention claimed is:

1. An electrical motor drive method for an electric motor comprising a rotor, connected to a motor shaft, and a stator, having brushes and comprising a plurality of commutator laminations for commutating windings arranged on the rotor, wherein the electric motor is driven by a pulsed or linearly controllable power source, with the motor shaft being connected to a radially driven load which has a non-linear torque profile over a revolution of the motor;
    wherein a ripple signal is obtained from a voltage potential which is applied to the motor and/or from a motor current, and rotor position information is acquired from the profile of said ripple signal, and
    wherein the motor current is increased by a predefined offset value for a specific time period at an angular position of the motor axis with a high torque requirement to produce a rectangular profile of the drive current.

2. The method of claim 1 wherein the radially driven load comprises a pump.

3. The method of claim 1, wherein power to the motor is varied during a revolution of the motor such that the period deviations in the ripple signal during a revolution of the motor is matched to the demand.

4. The method of claim 3 wherein the ripple signal during a revolution of the motor is matched to the demand wherein the fluctuations in rotation speed and/or the development of noise are/is as low as possible.

5. The method of claim 1, wherein a 36020 motor current drive profile is generated on the basis of 36020 torque profile characteristic variables of the load and the ripple signal, said motor current drive profile being used to drive the current of the motor, in a manner adapted to the torque profile of the load, over a revolution of the motor.

6. The method of claim 1, wherein the ripple signal is converted into a digital signal.

7. The method of claim 6, wherein a pulse spacing is a measure of the measured rotation speed.

8. The method of claim 7, wherein a time of a fluctuation in load is determined by measuring pulse spacings, and a phase angle of the motor current drive profile is determined with respect to a revolution of the motor in accordance with said time.

9. The method of claim 1, wherein the load is a hydraulic pump in an electronic motor vehicle brake system.

10. An electrical motor drive method for an electric motor comprising a rotor, connected to a motor shaft, and a stator, having brushes and comprising a plurality of commutator laminations for commutating windings arranged on the rotor, wherein the electric motor is driven by a pulsed or linearly controllable power source, with the motor shaft being connected to a radially driven load which has a non-linear torque profile over a revolution of the motor;

wherein a ripple signal is obtained from a voltage potential which is applied to the motor and/or from a motor current, and rotor position information is acquired from the profile of said ripple signal, and wherein the rotor exhibits at least one electrical rotor change, which can be measured at a commutation signal, in an angular region, the at least one electrical rotor chance allowing one or more angular positions to be marked.

11. The method of claim 10, wherein the at least one electrical rotor change involves:

a) at least one of the commutator laminations of a part of the commutator which is mounted on the rotor being changed in relation to the other commutator laminations; and b) a winding pattern or a number of turns of the turn segments fitted on a rotor armature being varied as a function of the angle.

12. The method of claim 11, wherein the at least one electrical rotor change involves at least one of the commutator laminations of a part of the commutator which is mounted on the rotor being changed in relation to the other commutator laminations aa) by said commutator lamination being composed of a different material and/or ab) said commutator lamination having a changed length with respect to the commutator circumference and/or ac) said commutator lamination having a different angular position.

13. The method of claim 10, wherein the rotor of the motor is oriented in relation to a pump shaft such that it has a defined angular position with respect to the angular position of the rotor and therefore the angular position of the at least one rotor change.

14. The method of claim 13, wherein the angular position is set and the at least one electrical rotor change is performed such that a change in torque produced by the at least one electrical rotor change and the existing fluctuations in load are automatically compensated for.

15. The method of claim 14, wherein the load is a hydraulic pump and the one or more angular positions are set such that a more uniform delivery of the hydraulic fluid and/or a reduction in noise are/is achieved.

16. An electronic brake control system comprising:

an electric motor comprising a rotor, connected to a motor shaft, and a stator, having brushes and comprising a plurality of commutator laminations for commutating windings arranged on the rotor, wherein the electric motor is driven by a pulsed or linearly controllable power source, with the motor shaft being connected to a radially driven load which has a non-linear torque profile over a revolution of the motor, wherein a ripple signal is obtained from a voltage potential which is applied to the motor and/or from a motor current, and rotor position information is acquired from the profile of said ripple signal, and wherein the motor current is increased by a predefined offset value for a specific time period at an angular position of the motor axis with a high torque requirement to produce a rectangular profile of the drive current.

* * * * *